(12) United States Patent
Adams et al.

(10) Patent No.: US 9,369,276 B2
(45) Date of Patent: Jun. 14, 2016

(54) DIGITAL SIGNATURE AUTHENTICATION WITHOUT A CERTIFICATION AUTHORITY

(71) Applicant: SIGNORITY INC., Ottawa (CA)

(72) Inventors: Carlisle Adams, Nepean (CA); Guy-Vincent Jourdan, Ottawa (CA)

(73) Assignee: Signority Inc., Ottawa (CA)

( * ) Notice: Subject to any disclaimer, the term of this patent is extended or adjusted under 35 U.S.C. 154(b) by 86 days.

(21) Appl. No.: 14/209,167

(22) Filed: Mar. 13, 2014

(65) Prior Publication Data

US 2014/0270160 A1    Sep. 18, 2014

Related U.S. Application Data

(60) Provisional application No. 61/783,368, filed on Mar. 14, 2013.

(51) Int. Cl.
*H04L 29/06* (2006.01)
*H04L 9/08* (2006.01)

(52) U.S. Cl.
CPC .................................. *H04L 9/0844* (2013.01)

(58) Field of Classification Search
USPC .......................................................... 380/44
See application file for complete search history.

(56) References Cited

U.S. PATENT DOCUMENTS

| | | | |
|---|---|---|---|
| 5,201,000 A | 4/1993 | Matyas et al. | |
| 6,072,876 A | 6/2000 | Obata et al. | |
| 6,868,160 B1 * | 3/2005 | Raji | 380/30 |
| 7,360,079 B2 | 4/2008 | Wall | |
| 7,783,041 B2 * | 8/2010 | Asokan et al. | 380/255 |
| 7,958,362 B2 | 6/2011 | Hwang | |
| 8,266,435 B2 | 9/2012 | Spalka et al. | |
| 2006/0083370 A1 | 4/2006 | Hwang | |
| 2007/0283161 A1 * | 12/2007 | Yami et al. | 713/183 |
| 2011/0191586 A1 | 8/2011 | Jung et al. | |
| 2012/0278628 A1 | 11/2012 | Chen | |

OTHER PUBLICATIONS

Authentication and Payment in Future Mobile Systems|https://securewww.esat.kuleuven.be/cosic/publications/article-67.pdf|Horn et al.|1998|pp. 1-17.*
Al-Riyami, S., & Paterson, K. Certificateless Public Key Cryptography. Advances in Cryptology—ASIACRYPT 2003 Lecture Notes in Computer Science, 452-473.
Galvin, J. M., & Feldman, M. MIME Object Security Services: Issues in a Multi-User Environment. In USENIX Security.

* cited by examiner

*Primary Examiner* — Mahfuzur Rahman
(74) *Attorney, Agent, or Firm* — Kristjan Spence; Perry + Currier Inc.

(57) ABSTRACT

Systems and methods for managing private and public encryption keys without the need for a third party certification authority. An initial value is generated by an authentication server. The initial value is divided into at least two portions and each portion is communicated with a user using different communication channels. The user receives the portions and enters a secret string value (i.e. a secret sentence) known only to the user. The portions are concatenated together to recreate the initial value. The portions, the initial value, and the secret string value are then used to create public and private keys for use by the user. Any recipient can authenticate digital signatures without needing the secret string value or the user's device can authenticate a digital signature using the portions and the secret string value.

4 Claims, 1 Drawing Sheet

DIGITAL SIGNATURE AUTHENTICATION WITHOUT A CERTIFICATION AUTHORITY

RELATED APPLICATIONS

This application is a non-provisional application claiming the benefit of U.S. Provisional Application No. 61/783,368 filed Mar. 14, 2013.

TECHNICAL FIELD

The present invention relates to public key cryptography. More specifically, the present invention relates to methods, devices, and systems for authenticating digital signatures using public key cryptography schemes without the need for a third party certification authority.

BACKGROUND OF THE INVENTION

The digital revolution of the late 20th century and the early 21st century has led to the increasing use of digital means of communications. Emails and other similar forms of communications have become the de facto means for non-verbal communications between people. However, this increase in digital communications has also increased the attention given to authenticating such digital communications.

A number of companies have emerged which have operated in the digital communications authentication field. However, these companies need to address not merely the authentication aspect of the issue but also the accessibility aspect of the issue.

Consider a company whose clients are mobile users who may sometimes use desktop computers. Sometimes these clients use laptops or smart phones, and sometimes they use tablets. The company wishes to offer a digital signature service to these clients, so that a client can sign a document and anyone else (i.e., other clients, or members of any other group including the general public) can verify that the signature is valid. It should be noted that the clients or individuals that use the digital signature service provided by the company may be members of the general public. Because each of the users of the service may have different devices with which they may want to access the service, it is not reasonable to require these users to install company-specific software applications on all their devices. As well, it is not practical to insist that clients interact with a 3rd-party Certification Authority (CA) to obtain a cryptographic key pair and a public key certificate suitable for verifying digital signatures prior to using the company's services.

A client's use of multiple devices therefore places some constraints on possible solutions to the authentication issue. In particular, the private signing key cannot be stored on one of the devices—storing the private key on only one device means that the key would not be available for the creation of signatures on the other devices. Simultaneously storing the private key on all the devices is also not advisable since it would be difficult to keep all the keys synchronized whenever key pairs are updated. Additionally, storing a secret or private key in multiple places increases the risk that the key may be compromised.

It should be noted that another option, that of storing the private key at the company's server, is not a viable solution for true, legally-binding digital signatures. This is because there must be convincing evidence that the signing key is known only to the signer and no one else. Such a scheme can therefore only work if the key is encrypted before storage on the company's server and only with a strong encryption key known only to the client. Given this requirement, it would therefore be difficult to generate, remember, and manage such an encryption key at the client's end.

One direction that has been considered in this area is the use of a biometric as this is sufficiently unique per user to distinguish him/her from others in a given population. Unfortunately, every biometric suffers from false positives and false negatives (e.g. some other user gets misidentified as Alice, or Alice gets misidentified as not-Alice), which can severely limit the repeatability of the key generation process. Furthermore, JavaScript code downloaded from a website is typically prevented by the browser from accessing the camera (i.e., for picture or video), microphone (i.e., for voice), or additional hardware components (e.g., for fingerprints) on devices. Even if such an access was possible (e.g., with newer versions of browsers and evolving standards such as HTML5), the quality of the microphone and camera on typical phones and tablets, and the environment in which they are used, would probably not provide a suitable input for a good, reliable biometrics. Similarly, JavaScript code can access mouse clicks and key presses, but the different characteristics of the various devices (e.g. mouse versus touch screen and full-sized keyboard versus compact keyboard versus virtual keyboard) precludes the level of consistency needed for something similar to mouse tracking or keyboard dynamics to produce the identical seed for a key generation algorithm across devices.

Another concern with this issue is that, with many state-of-the-art techniques, it is difficult to convincingly tie the key pair to a specific person/identity, especially in the absence of a trusted 3rd-party to perform the identification & authentication. In particular, if it is required that Alice digitally sign a document, the authentication server can send an e-mail with a link to the document and a password to the document to Alice's e-mail account. With this, all the security for this signing scheme rests on the security of Alice's email account password. Anyone that can ferret out her email account password can login to the authentication server as Alice and sign the document. Note that sending the document link and the login password as two separate e-mails does nothing to help this situation.

Furthermore, when someone logs into the authentication server, that person generates a key pair and thereby informs the server what their public key is. Therefore, it is possible that two users could have the same public key. If each user generates his/her own key pair, such a collision is highly unlikely to happen, but it is certainly possible that (1) Alice logs in as Bob (e.g., by learning his e-mail password; see above) and submits her own public key as his, or (2) Alice logs in as Alice and submits Bob's public key as her own. In the first scenario, Alice will be able to repudiate any signature she has created (claiming that Bob must have signed it). In the second scenario, Alice will be able to submit any document that Bob has signed to receive something (for example, his digital endorsement signature on the "back" of an electronic cheque) and receive that thing herself. In either scenario, the credibility of the digital signature system is undermined and the system will not be used.

Thus, what is required is (a) a more reliable way to generate key pairs, and (b) a more reliable way to bind the public key to a specific person and to ensure that duplicate public keys are avoided.

There is therefore a need for systems, methods, and devices that mitigate if not overcome the limitations of the prior art.

SUMMARY OF INVENTION

The present invention provides systems and methods for managing private and public encryption keys without the need for a third party certification authority. An initial value is generated by an authentication server. The initial value is divided into at least two portions and each portion is communicated with a user using different communication channels. The user receives the portions and enters a secret string value (i.e. a secret sentence) known only to the user. The portions are concatenated together to recreate the initial value. The portions, the initial value, and the secret string value are then used to create public and private keys for use by the user. The server can authenticate digital signatures without needing the secret string value or the user's device can authenticate a digital signature using the portions and the secret string value.

In a first aspect, the present invention provides a method for generating public and private keys in a public key-private key cryptographic scheme, the method comprising:
  a) receiving from a server multiple portions of an initial value by way of different communications channels, each of said multiple portions being transmitted to a user by a communications channel which is separate and different from communications channels used to transmit other portions of said initial value;
  b) receiving from said user a secret string value generated by said user;
  c) converting said secret string value into a digital secret string value;
  d) concatenating said multiple portions to recreate said initial value;
  e) receiving at least one system parameter from said server;
  d) using said multiple portions, said initial value, said at least one system parameter, and said digital secret string value to generate a public key-private key pair for said scheme.

In a second aspect, the present invention provides computer readable media having encoded thereon computer readable and computer executable instructions which, when executed by a processor, implements a method for generating public and private keys in a public key-private key cryptographic scheme, the method comprising:
  a) receiving from a server multiple portions of an initial value by way of different communications channels, each of said multiple portions being transmitted to a user by a communications channel which is separate and different from communications channels used to transmit other portions of said initial value;
  b) receiving from said user a secret string value generated by said user;
  c) converting said secret string value into a digital secret string value;
  d) concatenating said multiple portions to recreate said initial value;
  e) receiving at least one system parameter from said server;
  d) using said multiple portions, said initial value, said at least one system parameter, and said digital secret string value to generate a public key-private key pair for said scheme.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

The present invention is an alternative to the prior art methods and is based on the concept of not storing the private key anywhere. Instead, the key pair is regenerated whenever necessary at whatever device the client happens to be using. The key generation/regeneration software (e.g. a JavaScript applet) can be downloaded automatically without the user's explicit knowledge or action.

One attractive option for this concept is the use of a JavaScript applet—if the client interacts with the company using only a browser, then any device which can run the browser will have some JavaScript downloaded during the browsing session to accomplish the key generation. One issue is that of randomness (i.e., entropy) in the key generation process. To ensure that the generated keys are unique and unpredictable, entropy is required. Entropy can be introduced into the process by having the user generate part of what is used in the generation of the key pair.

Figure 1:
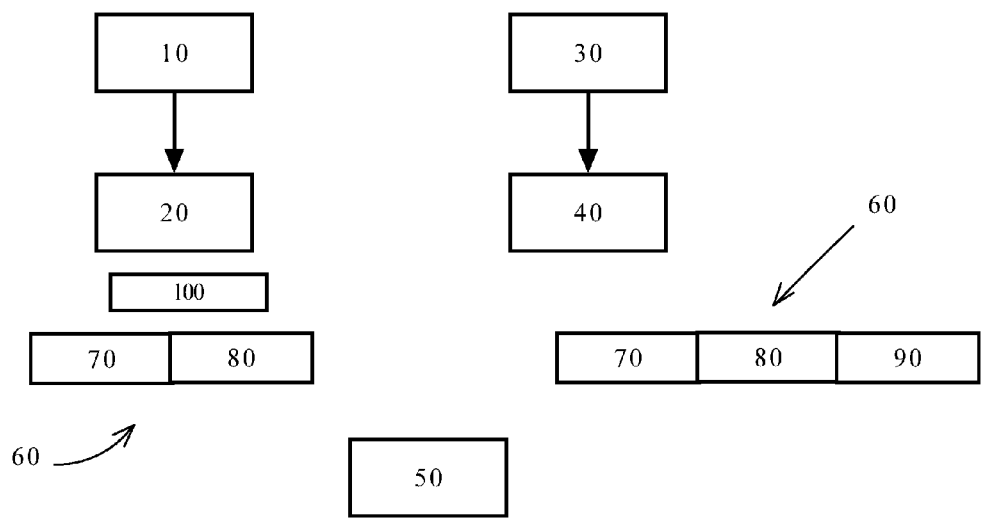
FIG. 1 is a block diagram illustrating the various parts of a system according to one aspect of the invention.

Referring to FIG. 1, a block diagram of a system and environment according to one aspect of the invention is illustrated. A first user 10 operates a computing device 20 to communicate with a second user 30 on computing device 40. An authentication server 50 provides authentication services to both first and second users using a public key-private key cryptography scheme.

For each user, the server generates a unique initial value 60. The initial value is divided into at least two portions, a first portion 70 and a second portion 80. For some applications, the initial value may be divided into three or more portions including a third portion 90.

The server communicates the first and second portions of each initial value to each user with each portion being communicated to a user using a communication channel different from that used for other portions. As an example, the server may send the first portion to the first user by email while the second portion is communicated by way of a text or SMS (short messaging system) message.

Once the portions of the initial value have been communicated to the user, the user can then use these portions to generate key pairs. To assist in this, the user formulates a secret string 100. The secret string 100 can be any sentence or string data that can include numbers, letters, or symbols and can be of an arbitrary length. For greater entropy, the user may capitalize, punctuate, or otherwise include different variations of words, letters, numbers, and symbols in the secret string. It is preferred, of course, that the secret string be easily remembered by the user.

To generate the public and private keys, the secret string provided by the user is converted into a numeric value to arrive at a digital secret string value. The digital secret string value, the initial value (recreated by the concatenation of the various portions), and the portions themselves are then used to generate the public and private keys.

It should be noted that public and private keys are generated by the computing devices 20, 40 used by users 10, 30. The computing devices 20, 40 run an application which takes as its input the secret string and the portions of the initial value to create the public and private key pair. The application may communicate with the server 50 to receive at least one if not multiple system parameters which may be required for the generation of the key pair.

In one implementation, the application may be a JavaScript applet. Most computing devices are able to execute JavaScript applets or applications. Accordingly, as long as the user can enter his or her secret string along with the different portions of the initial value and as long as the application can communicate with the authentication server, that user's private/public key pair can be generated and regenerated.

As an example, the invention can be used with the RSA public key signature process. For this example, a predetermined and fixed value r (a fixed 512-bit prime number) is set as a system parameter and is known to both the authentication server and the various computing devices being used. The steps in the example are as follows:
- the authentication server generates the initial value
- the initial value is divided into two portions p1 and p2
- the two portions are sent to the user by way of different and preferably independent communication channels (e.g. email, telephone call, fax, physical mail, SMS/text messaging)
- the user receives the two portions and enters the value of the portions into his or her computing device (or the user receives the two portions on the computing device)
- the user enters his or her secret string s into the computing device (e.g. "The Pope won't wear 15 funny hats including a homburg, a Panama hat, and a baseball cap.")
- the computing device calculates or determines:
  - a value p=the first prime number after $s^{p1}$ mod r
  - a value q=first prime number after $s^{p2}$ mod r
  - a value n=pq
  - a value $\phi=(p-1)(q-1)$
  - a value e=p1||p2 (i.e. e is the initial value as e is the concatenation of the first portion p1 and the second portion p2)
  - a value $d=e^{-1}$ mod $\phi$ Once the steps above are completed, the user's public key becomes the values n and e while his or her private key becomes the value d.

With the key pair generated, the user can use the private key to sign a communication to a receiving user. The user produces a hash value of the communication (i.e. produces a hash value h) and uses this hash value with the private key to produce the signature. This is done by computing $s'=h^d$ mod n where s' is the resulting digital signature. The receiving user thus receives the first user's communication, the digital signature in the communication, and the values n and e. The receiving user can now check to confirm that the sending user's signature is authentic and that the communication has not been tampered with. The receiving user's computing device calculates two signature values: $s'^e$ mod n=first signature value and a hash value (the second signature value) for the communication or message. If the two signature values are equal to one another, then the communication has not been tampered with and it is from the first user.

For the RSA example, note that e must be odd, so the least significant bit of p2 must be 1. Furthermore, e must be relatively prime to $\phi$. Thus, if gcd(e, $\phi$) is not 1, then the value for p is set to be the next prime after its current value and the value for q is set to be the next prime after its current value. Using these new values for p and q, the new value for $\phi$ is calculated. The process continues until gcd(e, $\phi$)=1. It should be noted that gcd(a,b) refers to the greatest common divisor of integers a and b or the largest positive integer that divides integers a and b without a remainder.

As another example, the invention may be used with the DSA (Digital Signature Algorithm) process. In DSA, there are system parameters p (a prime number between 512 and 1024 bits in length), q (a prime divisor of p−1 with length 160 bits), and g (a generator of the q-order subgroup of $Z_p$). A user's private key is x (a randomly-chosen integer between 0 and q) and his corresponding public key is $y=g^x$ mod p. To sign a document M, a user selects k (a random integer between 0 and q), and computes r'=(e mod p) mod q as well as $s'=(k^{-1}(H(M)+xr'))$ mod q, where H is the hash function SHA-1, a well-known standard cryptographic hash function. The user's signature is the tuple (r',s').

The invention may be used with DSA using the following steps:
- the authentication server generates systems parameters p and q along with g, the initial value which is unique to the user;
- r, a fixed 160-bit prime number, is set as a system parameter;
- the initial value g is divided into three portions, a first portion p1, a second portion p2, and a third portion g';
- the first and second portions are transmitted to the user using different and preferably independent communications channels while the system parameters p and q (as well as the third portion g') are passed to the user when the user downloads the applet for key pair generation;
- the user enters the received first and second portions p1 and p2 into the computing device along with a user-generated unique secret string s;
- the user's private key x is generated by the computing device as $x=(s^{p1}$ mod r$)\oplus(s^{p2}$ mod r);
- the initial value is reconstituted by concatenating p1, p2, and g' (i.e. g=p1||p2||g')
- the user's public key y is also generated as $y=g^x$ mod p;

Once the key pair has been generated, the user can then use the private key to generate a signature for a specific communication (e.g. an email or a digital letter). The user generates a signature for a specific communication m by:
- generating a random per-message value k where 0<k<q
- calculating $r'=(g^k$ mod p) mod q
- generate s' for message m using $s'=k^{-1}$ (H(m)+xr') mod q where H( ) is the hash function SHA-1

The user can thus send the message m along with the public key y, the value s', the initial value g, and the value r' to a recipient. The recipient can then authenticate the signature using these values along with the system parameters p, and q.

To authenticate the user's signature, the recipient's device computes:

$$w=s'^{-1} \bmod q$$

$$u_1=H(m)*w \bmod q$$

$$u_2=r'*w \bmod q$$

$$v=((g^{u_1}y^{u_2}) \bmod p) \bmod q$$

The recipient then concludes that the signature is authentic and that the message has not been tampered with if v=r'.

It should be noted that the initial values g and e in the examples above can introduce another level of entropy in the scheme and thereby adds security against spoofers. Even though g and e are publicly available after the key pair generation, the lack of bit length limitations on p1 and p2 as component parts of the initial value introduces another level of uncertainty for spoofers. Since the only limitation is that g=p1||p2, then p1 and p2 can be of arbitrary bit length as long as the sum of the bit lengths of p1 and p2 equal the bit length of g. Even if a spoofer knows the value of g, the spoofer does not know the cleave point or break point between p1 and p2 in g. As an example, if g is a random 100 bit number, p1 could be the first 50 bits and p2 could be the second 50 bits (at least for user A). Similarly, p1 could be the first 25 bits while p2 could be the second 75 bits for user B.

Figure 2:
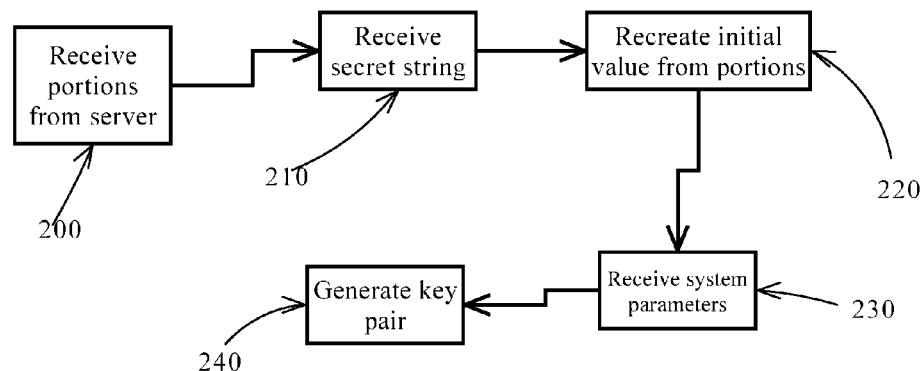
FIG. 2 is a flowchart detailing the steps in a process according to another aspect of the invention.

Referring to FIG. 2, a flowchart detailing the steps in a method according to one aspect of the invention is illustrated. The method steps are the steps taken by a computing device used by the user to generate the user's key pairs.

The method begins at step 200 where the device (or the user) receives different portions of the initial value from the server. These portions are received by way of different and preferably independent communication channels.

Once the different portions are received, the user's secret string is then received from the user (step 210). The user's secret string can be entered as a string into the device and the device can convert the string into a digital secret string value.

The next step (step 220) then recreates the initial value by concatenating the various portions received from the server. After this, the device also receives various system parameters from the server (step 230). In the example given above, this step can be part of downloading a Javascript applet which generates the key pair based on the different portions received and the user's secret string.

The final step (step 240) is that of generating the private and public key pairs using the different portions of the initial value, the user's secret string, and the system parameters.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for generating public and private keys in a public key-private key cryptographic scheme, the method comprising:

a) receiving, at a computing device from a server, multiple portions comprising at least a first portion p1 and a second portion p2 of an initial value e by way of different communication channels, each of said multiple portions being transmitted by a communication channel which is separate and different from communication channels used to transmit other portions of said initial value;

b) receiving, at said computing device from a user, a secret string value generated by said user;

c) converting, at said computing device, said secret string value into a digital secret string value s;

d) concatenating, at said computing device, said multiple portions p1 and p2 to recreate said initial value e;

e) receiving, at said computing device, at least one system parameter r from said server;

f) using said multiple portions, said initial value, said at least one system parameter, and said digital secret string value to generate a public key-private key pair for said scheme at said computing device by:

g1) determining a value p=first prime number after $s^{p1}$ mod r;

g2) determining a value q=first prime number after $s^{p2}$ mod r;

g3) determining a value n=pq where p and q are from steps g1) and g2);

g4) determining a value $\phi=(p-1)(q-1)$;

g5) determining a value $d=e^{-1} \pmod{\phi}$;

wherein said public key comprises said value n and said value e; and said private key comprises said value d;

wherein said cryptographic scheme further comprises, at a further computing device configured to receive a communication from said computing device:

h1) extracting a digital signature from said communication;

h2) converting said digital signature into a numeric value;

h3) determining a first signature value equal to $sig^e$ mod n where sig is said numeric value;

h4) producing a hash value of said communication to result in a second signature value;

h5) comparing said first signature value to said second signature value; and h6) concluding that said communication is authentic in the event said first signature value is equal to said second signature value.

2. A method for generating public and private keys in a public key-private key cryptographic scheme, the method comprising:
 a) receiving, at a computing device from a server, multiple portions comprising at least a first portion p1 and a second portion p2 of an initial value g by way of different communication channels, each of said multiple portions being transmitted by a communication channel which is separate and different from communication channels used to transmit other portions of said initial value;
 b) receiving, at said computing device from a user, a secret string value generated by said user;
 c) converting, at said computing device, said secret string value into a digital secret string value s;
 d) receiving, at said computing device, system parameters r, p and q and a further portion g' of said initial value g from said server;
 e) concatenating, at said computing device, said multiple portions p1, p2 and g' to recreate said initial value g;
 f) using said multiple portions, said initial value, said system parameters, and said digital secret string value to generate a public key-private key pair for said scheme at said computing device by:
  g1) determining a value $x=(s^{p1} \mod r) \oplus (s^{p2} \mod r)$
  g2) determining a value $y=g^x \mod p$;
  wherein
  said private key comprises said value x; and
  said public key comprises said value y.

3. A method according to claim 2 wherein said cryptographic scheme further comprises, at a further computing device configured to receive a communication from said computing device, the communication including a message m, a digital signature comprising values s' and r':
 h1) extracting said digital signature s', r' from said communication;
 h2) determining a number of values as follows:

$w = s'^{-1} \mod q$ $u_1 = H(m)*w \mod q$ $u_2 = r'*w \mod q$ $v = ((g^{u_1} y^{u_2}) \mod p) \mod q$ h3) confirming that said communication is authentic in the event v=r'.

4. A non-transitory computer readable medium having encoded thereon computer readable and computer executable instructions which, when executed by a processor, implements a method for generating public and private keys in a public key-private key cryptographic scheme, the method comprising:
 a) receiving, at a computing device from a server, multiple portions comprising at least a first portion p1 and a second portion p2 of an initial value e by way of different communication channels, each of said multiple portions being transmitted by a communication channel which is separate and different from communication channels used to transmit other portions of said initial value;
 b) receiving, at said computing device from a user, a secret string value generated by said user;
 c) converting, at said computing device, said secret string value into a digital secret string value s;
 d) concatenating, at said computing device, said multiple portions p1 and p2 to recreate said initial value e;
 e) receiving, at said computing device, at least one system parameter r from said server;
 f) using said multiple portions, said initial value, said at least one system parameter, and said digital secret string value to generate a public key-private key pair for said scheme at said computing device by:
  g1) determining a value p=first prime number after $s^{p1} \mod r$;
  g2) determining a value q=first prime number after $s^{p2} \mod r$;
  g3) determining a value n=pq where p and q are from steps g1) and g2);
  g4) determining a value $\phi=(p-1)(q-1)$;
  g5) determining a value $d=e^{-1} \mod \phi$);
  wherein said public key comprises said value n and said value e; and said private key comprises said value d:
 wherein said cryptographic scheme further comprises, at a further computing device configured to receive a communication from said computing device:
  h1) extracting a digital signature from said communication;
  h2) converting said digital signature into a numeric value;
  h3) determining a first signature value equal to $sig^e \mod n$ where sig is said numeric value;
  h4) producing a hash value of said communication to result, in a second signature value;
  h5) comparing said first signature value to said second signature value; and
  h6) concluding that said communication is authentic in the event said first signature value is equal to said second signature value.

* * * * *